United States Patent
Merscher

(10) Patent No.: US 11,236,832 B2
(45) Date of Patent: Feb. 1, 2022

(54) VALVE HOUSING MODULAR SYSTEM AND GLOBE VALVE

(71) Applicant: SAMSON AKTIENGESELLSCHAFT, Frankfurt am Main (DE)

(72) Inventor: Michael Merscher, Rödermark (DE)

(73) Assignee: SAMSON AKTIENGESELLSCHAFT, Frankfurt (DE)

( * ) Notice: Subject to any disclaimer, the term of this patent is extended or adjusted under 35 U.S.C. 154(b) by 0 days.

(21) Appl. No.: 16/265,751

(22) Filed: Feb. 1, 2019

(65) Prior Publication Data

US 2019/0234519 A1 Aug. 1, 2019

(30) Foreign Application Priority Data

Feb. 1, 2018 (DE) ............... 10 2018 102 251.4

(51) Int. Cl.
*F16K 5/20* (2006.01)
*F16K 27/02* (2006.01)
*F16K 39/02* (2006.01)
*F16K 31/122* (2006.01)

(52) U.S. Cl.
CPC .......... *F16K 5/204* (2013.01); *F16K 27/02* (2013.01); *F16K 27/0254* (2013.01); *F16K 31/1226* (2013.01); *F16K 39/022* (2013.01)

(58) Field of Classification Search
CPC ...... F16K 5/204; F16K 27/02; F16K 31/1226; F16K 27/0254; F16K 39/022
See application file for complete search history.

(56) References Cited

U.S. PATENT DOCUMENTS 2,152,831 A * 4/1939 Williams ............... F16K 39/022
251/210
3,010,695 A * 11/1961 Banks ................... F16K 39/022
251/205
3,493,008 A * 2/1970 Scaglione ............ F16K 39/022
137/219

(Continued)

FOREIGN PATENT DOCUMENTS

DE 102006061017 A1 7/2008
DE 202016104466 U1 10/2016

(Continued)

OTHER PUBLICATIONS

European Action dated Jul. 3, 2019 for Application No. 19 155 141.5 (with translation).

*Primary Examiner* — Matthew W Jellett
*Assistant Examiner* — Christopher D Ballman
(74) *Attorney, Agent, or Firm* — Schiff Hardin LLP

(57) ABSTRACT

In a valve housing modular system, different configurations for a globe valve arranged to adjust a process fluid flow are provided. The globe valve can have a globe valve member movable in translation along a stroke axis. The system can include a housing corpus with a process fluid inlet and outlet, a process fluid passage arranged therebetween, and an actuating opening to introduce the rod for actuating the globe valve member along the stroke axis; and a housing cover for covering the actuating opening. The system can include different adapters for the different functional/structural configurations.

20 Claims, 3 Drawing Sheets

(56) References Cited

U.S. PATENT DOCUMENTS

| | | | | |
|---|---|---|---|---|
| 3,542,056 | A * | 11/1970 | Chinn | F16K 39/022 137/271 |
| 3,556,463 | A * | 1/1971 | Williams | F01D 17/145 251/14 |
| 3,601,147 | A * | 8/1971 | Myers | F16K 39/022 251/282 |
| 3,648,718 | A * | 3/1972 | Curran | F16K 1/465 137/269 |
| 3,720,227 | A * | 3/1973 | Curran | F16K 1/465 137/339 |
| 3,722,860 | A * | 3/1973 | Curran | F16K 1/465 251/332 |
| 3,762,685 | A * | 10/1973 | Curran | F16K 27/02 251/362 |
| 3,892,384 | A * | 7/1975 | Myers | F16K 1/44 251/282 |
| 3,987,818 | A * | 10/1976 | Williams | F01D 17/145 137/630.13 |
| 3,990,475 | A * | 11/1976 | Myers | F16K 3/34 137/625.3 |
| 4,489,756 | A * | 12/1984 | Balz | F16K 3/0263 137/625.33 |
| 5,386,965 | A * | 2/1995 | Marchal | F16K 39/022 251/282 |
| 6,102,366 | A * | 8/2000 | Perez C. | F16K 7/20 251/175 |
| 6,536,472 | B2 * | 3/2003 | Baumann | F16K 39/022 137/625.3 |
| 6,905,108 | B2 * | 6/2005 | Hall | F15B 15/10 251/285 |
| 6,997,211 | B2 * | 2/2006 | Alman | F16K 1/36 137/625.33 |
| 7,000,895 | B2 * | 2/2006 | Gessaman | F16K 17/0413 251/282 |
| 7,748,401 | B2 * | 7/2010 | Zecchi | G05D 16/0647 137/315.05 |
| 8,038,121 | B2 * | 10/2011 | Gessaman | F16K 1/38 251/122 |
| 8,235,357 | B2 * | 8/2012 | Takei | F16K 27/02 251/318 |
| 8,292,264 | B2 | 10/2012 | Hoffmann et al. | |
| 8,505,578 | B2 * | 8/2013 | Nebel | F16K 39/022 137/625.38 |
| 8,596,610 | B2 * | 12/2013 | Wears | F16K 47/08 251/332 |
| 8,783,647 | B2 * | 7/2014 | Medina | F16K 31/1223 251/282 |
| 8,794,592 | B2 * | 8/2014 | Zhou | F16J 15/184 251/214 |
| 9,677,673 | B2 * | 6/2017 | Ristau | F16K 47/08 |
| 9,816,622 | B2 * | 11/2017 | Chiba | F16K 47/02 |
| 2001/0005005 | A1 * | 6/2001 | Bonomi | F16K 1/10 251/63 |
| 2005/0062000 | A1 * | 3/2005 | Bartell, Jr. | F16K 15/063 251/82 |
| 2009/0320931 | A1 * | 12/2009 | Wears | F16K 47/08 137/15.18 |
| 2010/0301252 | A1 * | 12/2010 | Myran | B01D 61/06 251/326 |
| 2011/0146814 | A1 * | 6/2011 | Groves, II | F16K 3/265 137/528 |
| 2016/0178080 | A1 * | 6/2016 | Dobbs | F16K 3/246 251/318 |
| 2017/0314703 | A1 * | 11/2017 | Hoerschken | F16K 1/32 |
| 2018/0045311 | A1 | 2/2018 | Sander | |
| 2018/0328517 | A1 * | 11/2018 | Zhou | F16K 47/08 |
| 2018/0355998 | A1 * | 12/2018 | Torp | G05D 16/187 |
| 2019/0017613 | A1 * | 1/2019 | Lee | F16K 15/18 |

FOREIGN PATENT DOCUMENTS

| | | |
|---|---|---|
| EP | 3 239 575 A1 | 11/2017 |
| WO | 2012/012951 A1 | 2/2012 |
| WO | 2017/063187 A1 | 4/2017 |

* cited by examiner

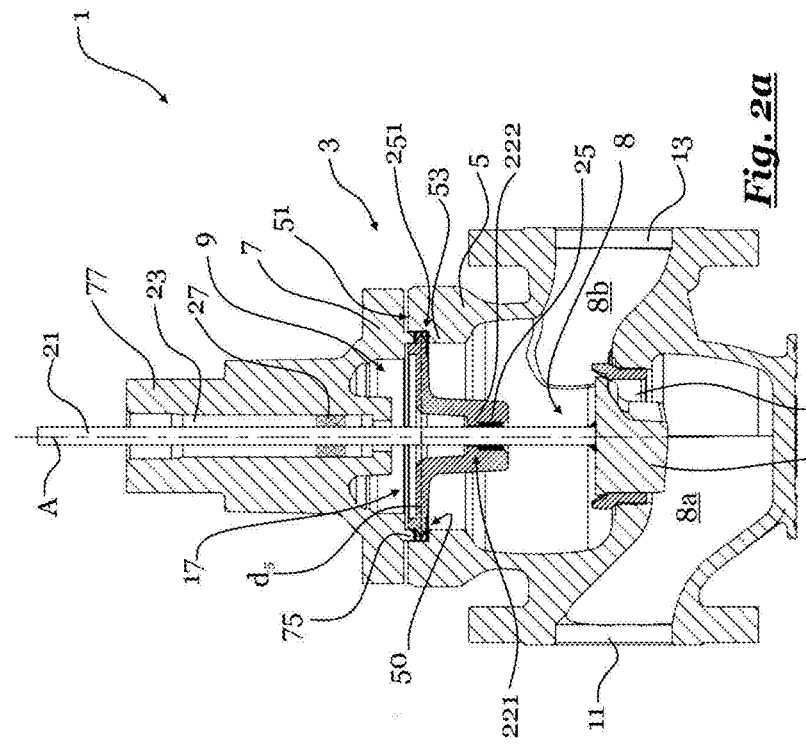
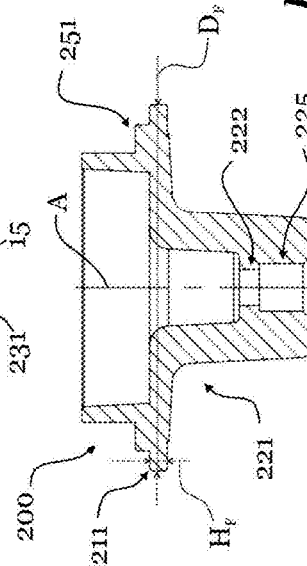
Fig. 2a
Fig. 2b
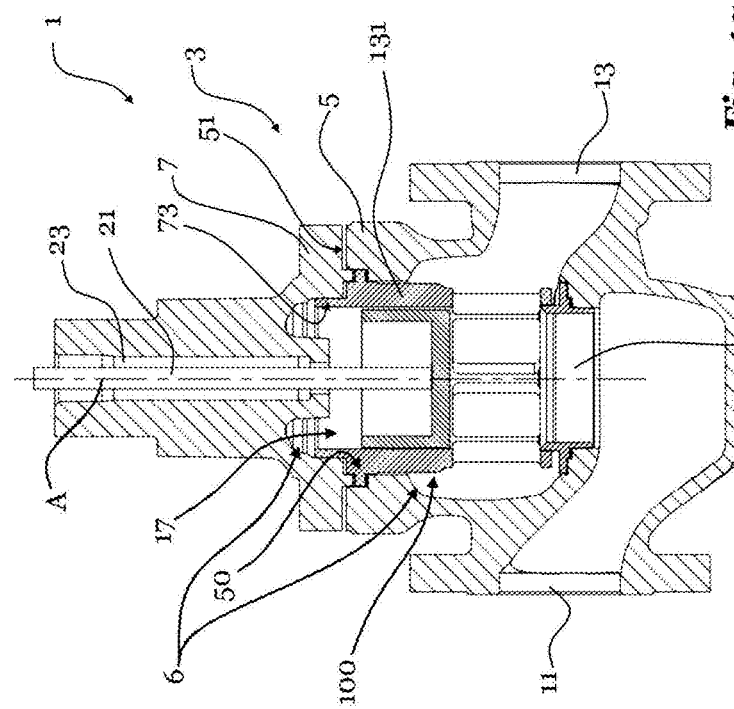
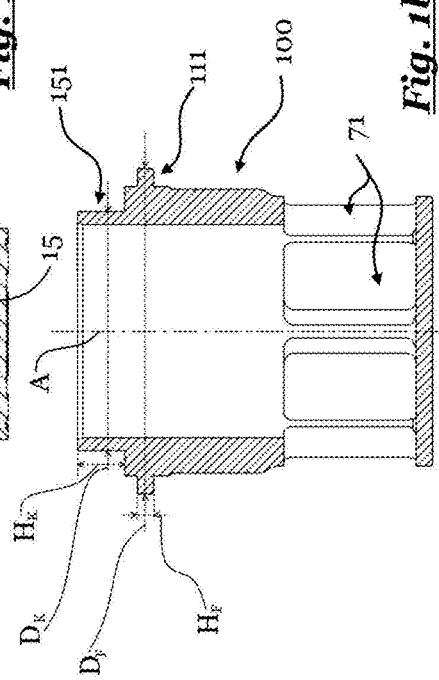
Fig. 1a
Fig. 1b

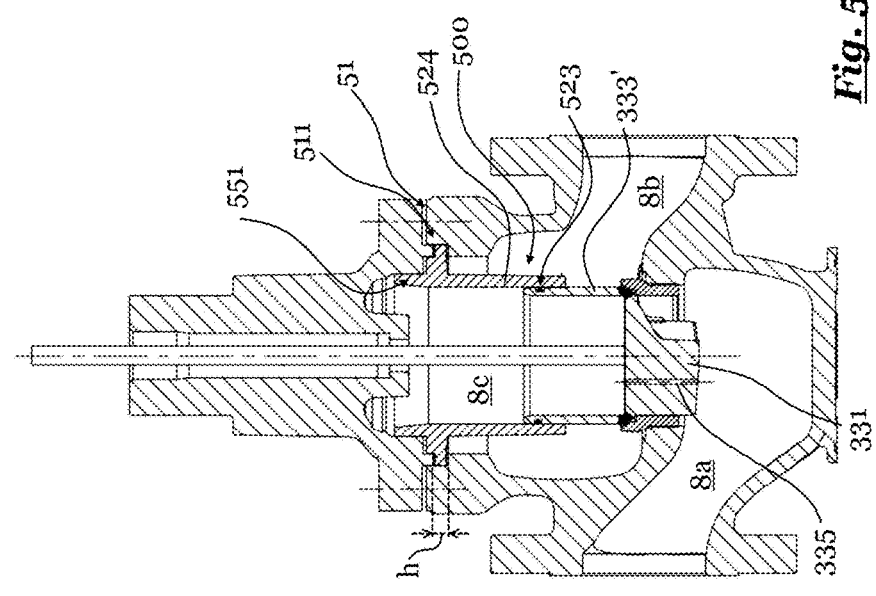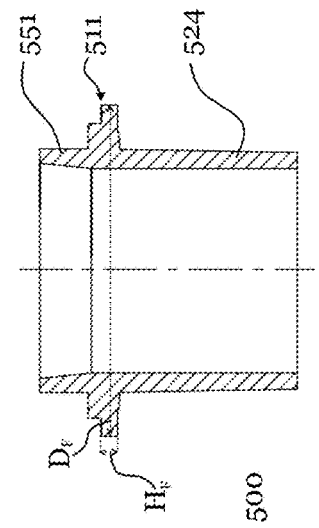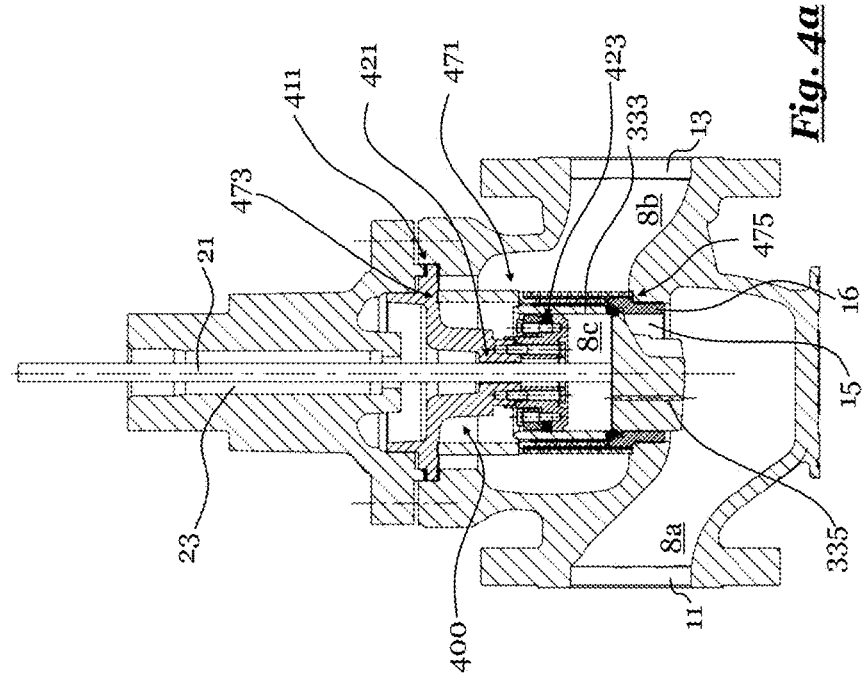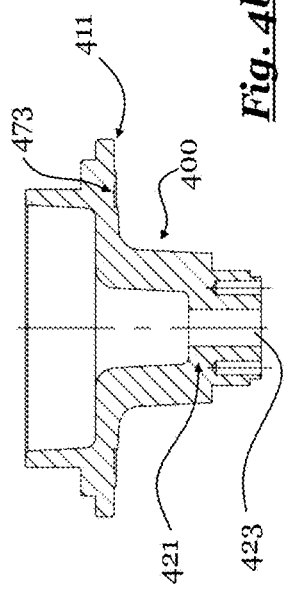

VALVE HOUSING MODULAR SYSTEM AND GLOBE VALVE

CROSS REFERENCE TO RELATED APPLICATIONS

This patent application claims priority to German Patent Application No. 102018102251.4, filed Feb. 1, 2018, which is incorporated herein by reference in its entirety.

BACKGROUND

The disclosure relates to a valve housing modular system for providing one of several different functional or constructional configurations for a globe valve. Such a globe valve is usually configured to adjust the process fluid flow of a process plant, such as a chemical plant, a food processing plant, a power plant or the like. The distinguishing feature of globe valves is that they have a translatory movable globe valve member. The disclosure also relates to a globe valve with a globe valve member movable in translation along a stroke axis for adjusting the process fluid flow of a process plant.

Globe valves can be provided with a cone valve configuration (so-called cone valves). The valve body of a conical valve usually consists of a housing corpus with a valve seat and housing cover inserted in it. The valve of a conical valve is formed by a name-giving conical adjusting member, which is supported by an adjusting rod and, together with the adjusting rod, performs a translatory stroke actuating movement along a translatory stroke axis. The so-called valve cone has a contour that tapers in sections or completely in the direction of the stroke axis and does not have to be ideally conical. Depending on the relative position of the conical adjusting member to the valve seat, the process fluid flow is adjusted differently. For example, a cone valve can assume a completely closed position in which the conical adjusting member is in sealing contact with the valve seat. As the adjusting member moves away from the valve seat, the plug valve provides an increasingly larger opening width through which process fluid can flow from the inlet to the outlet of the housing corpus. The adjusting rod that carries the conical adjusting member is usually led out of the housing through an opening in the body cover. Outside the housing, a pneumatic or electric adjusting member can access the adjusting rod to actuate it and move the conical adjusting member relative to the valve seat. The body cover is usually screwed into the housing corpus. To seal the inside of the process fluid housing from the outside of the housing, plug valves usually have at least one seal between the housing corpus and the housing cover. In addition, a seal is usually provided between the housing cover and the valve rod guided in it. In order to ensure a seal between the inlet and outlet in the closed cone valve state, a seal between the valve seat and the housing corpus is also normally provided. An adjusting member or a yoke carrying the adjusting member or the like can be provided directly on the housing cover. An example of a cone valve is shown in DE 10 2006 061 017 A1.

Other types of valves can include, for example, globe valves configured as cage valves (so-called cage valves). Cage valves are equipped with an adjusting member which has a cylindrical outer side extending in the direction of the stroke axis over a certain length. Such an adjusting member can be referred to as a piston-type actuator or control piston. The control piston of the cage valve is actuated by a control rod which moves in translation along the travel axis. In a cage valve, the piston-like adjusting member is guided in the valve cage that gives the cage valve its name. The valve cage is a normally hollow cylindrical body which has an inner side which is essentially complementary in shape to the cylindrical outer side of the control piston. The valve cage may have one or more orifices allowing the process fluid to flow through the valve cage in the radial direction relative to the stroke axis and the corresponding cage axis. The valve cage is fixed in a housing corpus of the cage valve and may allow process fluid to flow from an inlet of the housing corpus to an outlet of the housing corpus when the valve piston is in an open position. When the control piston is in a closed position relative to the valve member, the radial openings of the valve cage are covered by the control piston so that no process fluid can flow from the inlet to the outlet of the body. For example, to attach the valve cage to the body, the hollow cylindrical valve cage may sit on a shoulder of the body and be attached to one end of the body by a nut-like attachment or to the body by the cover. The adjusting rod of the cage valve is usually led through a cover to an outside area where a pneumatic or electric stroke actuator, for example, can access the adjusting rod. The cover is usually attached to the housing body with a flange connection. An example of a cage valve is shown in DE 20 2016 104 466 U1.

Due to the different areas of application for cone valves and cage valves, individual, different construction rules apply to both valve types. In the case of the well-known cone and cage valves, the cover and body are generally cast parts. Different covers are required for different valve types and even for valves of the same type for different applications. An individual casting mold is required for each cover design. Changes to the molds are costly and time-consuming.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 1a shows a globe valve in a cage valve configuration with a first adapter of a valve housing modular system according to an exemplary embodiment of the disclosure;

FIG. 1b shows the cage valve configuration adapter of the globe valve shown in FIG. 1a;

FIG. 2a shows a globe valve in a conical valve configuration with a second adapter of the valve housing modular system according to an exemplary embodiment of the disclosure FIG. 2b shows the cone valve configuration adapter of the globe valve according to FIG. 2a;

FIG. 3b shows the adapter of the globe valve according to FIG. 3a;

FIG. 4a shows a globe valve with another cone valve configuration adapter of the valve housing modular system according to an exemplary embodiment of the disclosure, which has a mounting groove for receiving a flow divider;

FIG. 4b shows the adapter of the globe valve according to FIG. 4a;

FIG. 5a shows a globe valve with another adapter of the valve housing modular system according to an exemplary embodiment of the disclosure; and FIG. 5b shows the adapter of the globe valve according to FIG. 5a.

Figure 3C:
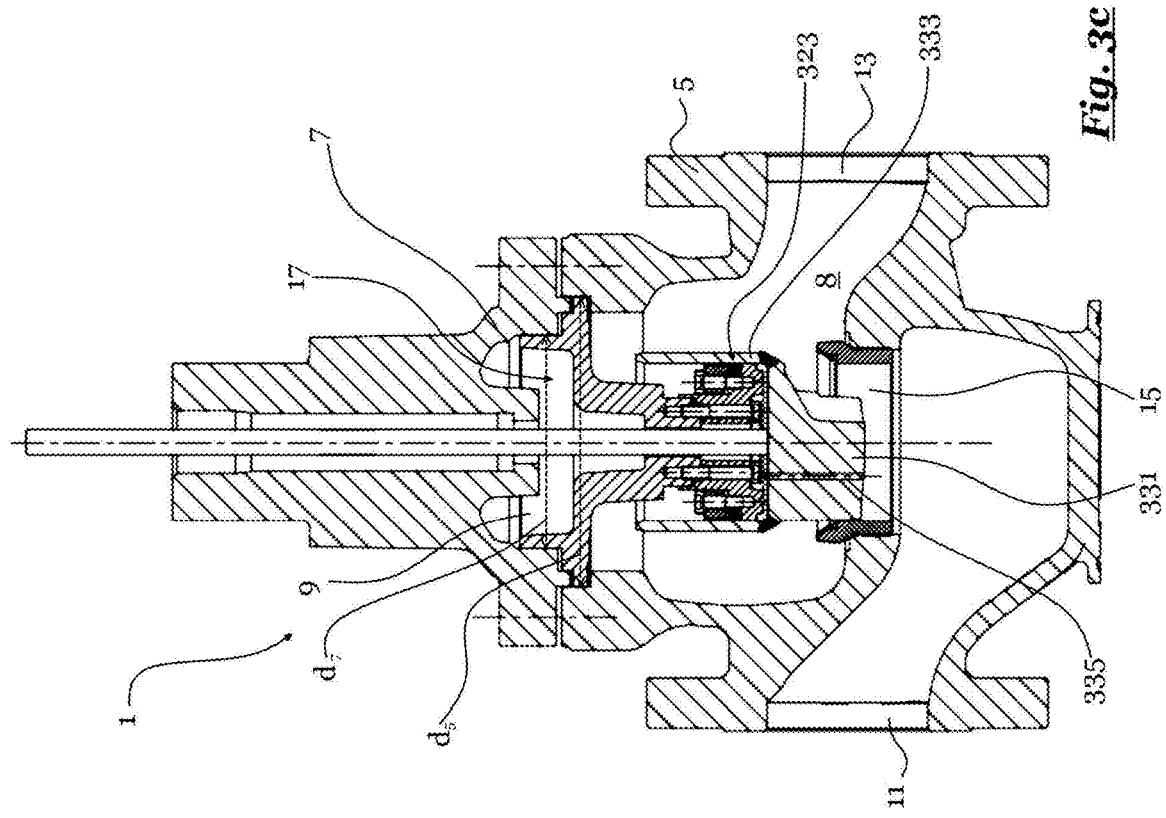
FIG. 3c shows the globe valve according to FIG. 3a with the actuator in an open position.

The exemplary embodiments of the present disclosure will be described with reference to the accompanying drawings. In the drawings, the same or similar reference signs are used for identical or similar components. With respect to different valve configurations or adapters, similar components of different configurations will have reference symbols increased by 100.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

An object of the present disclosure is to provide a valve housing modular system that provides one of several different functional or construction configurations for a globe valve. The valve has a globe valve member that moves in translation along a stroke axis. The globe valve is configured to adjust the process fluid flow of a process plant, such as a chemical plant, a food processing plant, a power plant or the like. The modular valve housing system according to exemplary embodiments of the disclosure comprises a housing corpus, a housing cover and several different adapters, each for one of the different functional or construction configurations. The housing body has a process fluid inlet, a process fluid outlet and a process fluid passage arranged between the process fluid inlet and the process fluid outlet. The housing corpus also includes an actuating opening for inserting the adjusting rod to actuate the globe valve member along the stroke axis.

At the process fluid outlet and at the process fluid inlet of the housing corpus, mounting devices, e.g. flange-like fastening sections, can be provided for connecting one pipe each for guiding process fluid. A valve seat can be provided at the process fluid passage of the housing corpus, which can cooperate with a globe valve member to close and/or open. A valve seat can be a one-piece part of the housing corpus. A valve seat may be a ring- and/or sleeve-shaped seat of the insert component. The valve seat may have one or more sealing surfaces for sealing cooperation with the globe valve member, in particular a valve plug. A sealing device, such as a ring seal, may be arranged between the valve seat and the housing corpus. The valve seat can be detachably connected to the housing corpus, for example with a threaded connection or a flange-like connection.

The housing corpus may be a one-piece body made of one or more media and/or temperature resistant materials. For example, the housing body may be a one-piece cast metal body or forged body with a machined, e.g. polished and/or coated, e.g. painted, powder coated, chrome plated, enameled, galvanized or similar body. It may be preferable for the housing corpus to define a housing interior, the openings of which are preferably realized exclusively through the process fluid inlet, the process fluid outlet and the actuating openings. It is conceivable that a housing body may also have further openings in the interior, e.g. openings for the introduction of sensors may have one or more further process fluid inlets or outlets.

The housing cover of the valve housing modular system is designated to cover the actuating opening. The housing cover has a through opening extending in the direction of the travel axis to accommodate the adjusting rod. In particular, the housing cover may include a mounting portion for mounting a pneumatic adjusting member, in particular, or a yoke or the like for supporting an adjusting member. In an exemplary embodiment, the through opening is free of sealing means for sealing between the housing cover and the adjusting rod. In an exemplary embodiment, the through opening is free of guides such as a plain bearing, a ball bearing or the like for translational guidance of the adjusting rod. With respect to the adjusting rod, the housing cover can be dimensioned such that the smallest clear width, in particular the smallest inside diameter, of the housing cover, in particular the through opening, is at least 1 mm or at least 5 mm larger than the outside diameter of the adjusting rod in the region which extends through the through opening of the housing cover. The housing cover may be made of a temperature and/or media resistant material. It is conceivable that the same material selection has been made for the housing corpus and the housing cover. The housing cover and the housing corpus can be configured for mounting the housing cover in direct contact with the housing corpus. For example, the housing corpus and the housing cover may have corresponding flange sections for attaching the housing cover to the housing corpus. The housing cover may have a plate-like cover section which may preferably be configured to completely close the actuating opening of the housing corpus in the radial direction and in the circumferential direction with respect to the stroke axis with the exception of the through opening.

In an exemplary embodiment, the valve housing modular system comprises several different adapters for one of the different functional or construction configurations for the globe valve. The modular valve housing system can, for example, include several different adapters for the constructive configuration of the globe valve as a cone valve. For example, an individual adapter can be provided for each configuration of the globe valve as a control valve, emergency closing valve, emergency opening valve, pressure-balanced control or closing valve or the like. For example, an adapter with different configurations of a plug valve can be defined for different control ranges, such as in particular a nominal flow rate, a minimum flow rate (or a closing movement) and/or a maximum flow rate, in particular with respect to a certain process medium and/or a certain process pressure range. In an exemplary embodiment, different adapters for different cage valve configurations may be provided to provide differently configured globe valves. It is clear that with the modular valve housing system, the same housing corpus and the same housing cover are provided for the different construction or function configurations, whereby the function or construction configuration is defined by a respective adapter.

In an exemplary embodiment, each of the adapters has a cylindrical retaining flange section with a predetermined flange height and diameter. The housing corpus has a corpus interface adapted to the retaining flange section. The housing cover includes a cover interface adapted to the retaining flange section. The housing corpus and the housing cover of the valve housing modular system are configured to receive and hold the respective cylindrical retaining flange portion of the different function or design configuration adapters by means of the corpus interface and the cover interface, respectively. The corpus interface, the cover interface and the retaining flange section are matched to each other in such a way that each of the several different adapters of the modular valve housing system can be freely exchanged between the corpus and the cover. The selection of a configuration adapter corresponding to any desired valve type allows the manufacturer or the user to implement a wide variety of valve designs with the same valve body or body and housing cover. The constant interface for the adapter, which is realized by the corpus interface and the cover interface, is provided by a modular valve housing system. With the modular valve housing system in line with the disclosure, it is possible to manufacture and use constant valve housings or housing bodies and housing covers for different applications and to provide a globe valve which is adapted to the individual requirements by means of an adapter in the form of a functional or design configuration. By unifying the housing corpus and housing cover, it is also possible to ensure unified assembly, which reduces training requirements and makes manufacturing, assembly and maintenance processes more efficient. Advantageously, considerably fewer different casting molds are required to manufacture different types of valves and different valve designs based on exemplary embodiments of the disclosure. The standardization of the cover shape for different valve types or valve designs reduces manufacturing costs. Surprisingly, it has been shown that the adapter, which can be a cast part, allows a comparatively faster and simpler post-processing and thus better adaptability to any individually required configuration. The adapter can be manufactured as a 3D printed part.

In an exemplary embodiment, a valve body modular system includes at least one adapter for configuring the globe valve as a cone valve with a conical adjusting member supported by a control rod. The adjusting rod moves in translation along the stroke axis to position the conical adjusting member relative to a fixed valve seat located within the housing corpus. The adapter comprises a sleeve-shaped guide section which extends from the retaining flange section in the direction of the stroke axis. The sleeve-shaped guide section comprises a guide opening for the coaxial, preferably complementary, reception of the adjusting rod. The adapter can form or receive a guide opening in the guide section. This guide opening can, for example, be in the form of a plain bearing, a ball bearing or similar. In an exemplary embodiment, a sliding fit or a clearance fit is formed between the adjusting rod and the guide section. In particular, the adjusting rod is in contact with the guide opening of the adapter within the section guiding the translatory stroke movement, whereby in particular the adjusting rod is free of contact with the housing cover and in particular the housing cover's through opening. According to this configuration, the adapter is intended to guide the stroke movement of the adjusting rod and this function is not left to the housing cover or a component located radially in the housing cover between the adjusting rod and the housing cover. Compared to conventional valves, this advantageously allows a more favorable production and assembly of the housing cover, because the guiding characteristics are improved by guiding the adjusting rod closer to the valve seat that can be brought into contact with the conical adjusting member, whereby in particular a free bending length of the valve rod is shortened compared to a guide in the cover. A cover free of rod guide and free of rod seal does not need to cover the actuating opening in the radial direction. A cover may be provided for connecting yoke or the like to the housing corpus. A cover can be configured as a connecting piece for attaching a pneumatic adjusting drive, in particular, to the housing corpus. A cover for connecting a yoke or an adjusting drive can, for example, be hood-like, disc-like or with circumferentially distributed struts or beams.

In an exemplary embodiment, the valve body modular system includes a rod seal to seal between the adjusting rod and the adapter. The adapter has a receptacle for the preferably cylindrical sleeve rod seal. The rod seal can be a gap seal, labyrinth seal or packing seal. The mounting for the rod seal can be located especially in the guide section of the adapter. In an exemplary embodiment, the rod seal to be arranged at an axial distance relative to the housing cover. In an exemplary embodiment, the housing cover is free of a rod seal. In the axial direction relative to the stroke axis, the rod seal prevents leakage of the process fluid along the adjusting rod from the valve interior, which is limited by the housing corpus and the adapter. It is preferred that this process fluid-carrying valve interior, which is defined by the adapter and the housing corpus, is fluid-tightly separated from the housing cover. The housing cover does not come into contact with the process fluid inside the interior defined by the adapter and the housing corpus. Compared to the "wet" valve interior carrying the process fluid, the housing cover is located in a process fluid-free "dry" ambient area. With such a configuration, the function of the cover is essentially limited to holding the adapter in the housing corpus, providing a mechanical connection to an adjusting drive or yoke carrying the adjusting drive or the like, and providing mechanical protection of the housing interior. By transferring the sealing function, which is usually assigned to the housing cover, to another component in the form of the adapter, the housing cover can be manufactured much more cheaply with lower requirements on the materials resistant to temperature and/or media or chemicals than with conventional globe valves. In addition, a cavity between the adapters and the cover, which is operationally free of process fluid, can provide a process fluid retention space in the event of a surprising failure of the rod seal, so that in the event of a rod seal malfunction, environmental contamination with process fluid can be significantly reduced. It is clear that at least one adapter flange seal can be located in the area of the retaining flange section, in particular in the area of the cabinet interface and/or in the area of the cover interface.

Alternatively, in an exemplary embodiment, the valve housing modular system includes a first rod seal or primary seal for sealing between the adjusting rod and the adapter and a second rod seal or secondary seal for sealing between the adjusting rod and the cover. The secondary seal can be a packing seal, gap seal or labyrinth seal. The primary seal is preferably configured differently from the secondary seal, e.g. made of different material and/or in a different design. For example, the primary seal can be a gap or labyrinth seal and the secondary seal a packing seal. The primary seal prevents the fluid flow from spreading unhindered in the direction of the cover. For example, cryogenic or very hot process media are prevented from reaching the secondary seal at process temperature by the primary seal.

According to a valve housing modular system of an exemplary embodiment, the conical adjusting member has a sleeve-shaped collar and a pressure relief channel running through the adjusting member in the axial direction with respect to the stroke axis. The adapter has a seal cooperating with the collar, in particular a ring seal. A pressure relief chamber can be provided by means of the collar and the seal supported by the adapter. The pressure relief chamber can be fluidically connected to the high pressure area or upstream area of the valve interior via the pressure relief channel. By means of the pressure relief channel which extends through the adjusting member, process fluid can flow from the upstream valve interior area, i.e. starting from the process fluid inlet, into a pressure relief chamber, so that the process fluid pressure acts in the axial direction of the stroke axis from both sides on the conical adjusting member, so that no or almost no process fluid pressure difference acts on the adjusting member; especially not if there is a higher process fluid pressure in the inlet or upstream area of the valve chamber near the process fluid inlet than in the outlet or downstream area of the valve chamber. The collar cooperating seal or collar seal supported by the adaptor may be supported radially internally with respect to the collar by the adaptor or radially externally with respect to the collar by the adapter.

Alternatively or additionally, in an exemplary embodiment, a seal can be supported at least partially by the collar and cooperate with a sealing surface of the adapter, in particular radially on the inside or radially on the outside.

In a configuration of the valve housing modular system according to an exemplary embodiment, the adapter, the housing corpus and/or a component fixed to the housing corpus, such as the valve seat, can have a positive-locking connection, such as a retaining groove, for receiving a flow divider. The form-fit connection can run particularly around the process fluid passage. In particular, the form-fit connection, preferably the retaining groove, can be annular. In an exemplary embodiment, the form-fit connection is complementary in shape to a frontal and/or a foot-side fastening section of a flow divider. A flow divider can be provided in a globe valve, for example to reduce the pressure on the process fluid between the process fluid inlet and outlet. For example, a flow divider can be provided in the form of a sleeve, in particular a cylindrical sleeve, with at least one radial opening. The flow divider is preferably free of contact with the adjusting member, in particular the conical adjusting member including its possible collar. In particular, in the modular valve housing system, no guide is arranged between the flow divider and the, in particular conical, adjusting member and any collar of the latter.

In a configuration of the valve housing modular system according to an exemplary embodiment, the adapter is arranged axially with respect to the stroke axis between the housing corpus and the housing cover. In an exemplary embodiment, the cover extends completely beyond the flange diameter of the adapter in the radial direction, starting from the adjusting rod or the through opening surrounding it. The cover and/or housing corpus may have at least one projection in the axial direction with respect to the stroke axis, preferably a full circumferential projection, which is greater than the flange height of the holding flange section of the adapter. Housing corpus and housing cover may be configured to completely surround the adapter. In an exemplary embodiment, the adapter is completely housable within the housing interior, which is defined by the housing cover and the housing corpus. As described above, the adapter can be configured to divide the housing interior into a wet, process fluid-carrying valve interior and a dry, process fluid-free cavity. Alternatively, in an exemplary embodiment, the adapter subdivides the housing interior into a process fluid-carrying valve interior, in which the process fluid flow is guided, and into a protected cavity between cover and adapter, which is separated from the flow of the process fluid, i.e. in which there is a lower (practically no) flow velocity, and/or in which there is a lower temperature and/or a lower pressure compared to the temperature and/or pressure of the process fluid flow in the valve interior. By completely accommodating the function and/or construction configuration adaptor inside the housing formed by the housing cover and the housing body, the valve adapter is protected from external influences, such as weathering influences, mechanical influence flows. This advantageously ensures safe operation of the globe valve by means of the adapter even under problematic ambient conditions.

In a configuration of the valve housing modular system according to exemplary embodiment, the cover interface together with the cabinet interface forms a ring-shaped receptacle into which the retaining flange section of one of the several adapters can be inserted. In an exemplary embodiment, the ring-shaped receptacle extends at least partially circumferentially around the stroke axis. With regard to the axial direction of the stroke axis, the housing corpus and/or the housing cover can be equipped with a recess, such as a step or shoulder, on which a (e.g. flat) upper side or underside of the cylindrical retaining flange section of the adapter can be supported axially. It is clear that the retaining flange section does not need to have the ideal cylindrical shape of a straight circular cylinder with a perfect circular base. Rather, the cylindrical retaining flange section in a modular valve housing system according to the disclosure can be round or non-circular, in particular deviating from a circular shape and/or with radial and/or axial projections and/or recesses. The cylindrical retaining flange section may, for example, have a circular, polygonal, oval or other cross-section. Protrusions and/or recesses of the retaining flange section may be adapted for preferably form-complementary receptacles in the corpus interface and/or the cover interface.

In a configuration of the valve housing modular system according to an exemplary embodiment, the receptacle has a predetermined axial height in the direction of the stroke axis. The axial height of the receptacle extends from the housing corpus to the housing cover. The axial height provides at least a predetermined clear width. In particular, the retaining flange sections of the several adapters and the receptacle can be complementary in shape to each other. Preferably the axial height can be equal to the flange height.

It is clear that in the axial direction above and/or below the retaining flange section at least one seal, such as a ring seal, can be accommodated in the receptacle in one or more embodiments. The use of a seal in the receptacle does not interfere with, for example, the complementary shape of the receptacle for the adapter formed by the housing corpus and housing cover.

According to a configuration of a valve housing modular system of an exemplary embodiment, the corpus interface is defined by a step-like recess of the corpus at the upper end of the corpus in axial direction with respect to the stroke axis. On the radial inner side of the upper body end, such as in the region of the actuating opening, a at least partially circumferential (or fully circumferential in one or more embodiments) stepping with a radial width starting from the inner side (the clear width of the actuating direction) of the housing corpus, which is at least 5 mm, preferably at least 10 mm wide, can be formed, preferably in the region of the actuating opening. In the axial direction, the recess can be at least 5 mm, preferably at least 10 mm deep.

In a valve housing modular system according to an embodiment, the corpus interface has a corpus inner diameter which corresponds to an adapter outer diameter, in particular the flange diameter. Alternatively or additionally, in an exemplary embodiment, the cover interface can have an inside cover diameter corresponding to an adapter outside diameter. It is conceivable that the adapter has different outside diameters, wherein a first outside diameter is dimensioned to match a predetermined corpus inside diameter and wherein a second adapter outside diameter is dimensioned to match a predetermined cover inside diameter. The fitting sections of the adapter, which are designed with the respective adapted flange diameter and extend over a certain axial width, can have a height of at least 5 mm, preferably at least 10 mm, in the axial direction with respect to the stroke axis. For example, an adapted adapter outer diameter can realize the predetermined flange diameter and be insertable into the corpus interface with a predetermined corpus inner diameter. A second, smaller, predetermined adapter outer diameter can correspond to a corresponding lid inner diameter and form a mounting collar of the adapter which can be inserted axially into the lid. In this way, safe and precise positioning and mounting of the adapter can be achieved.

In a configuration of a valve housing modular system according to an exemplary embodiment, the modular system further comprises at least one adapter for configuring the globe valve as a cage valve with a piston-like adjusting member and a valve cage surrounding the process fluid passage relative to the stroke axis, the valve cage comprising a translatory guide cooperating with the adjusting member. In this configuration, the valve seat can be detachably connected to the housing corpus by the valve seat being clamped between the valve cage and the housing corpus.

The disclosure also relates to a globe valve with a globe valve member movable in translation along a stroke axis for adjusting a process fluid flow in a process plant, such as a chemical plant, a food processing plant, a power plant or the like. In an exemplary embodiment, the globe valve comprises a housing corpus with a process fluid inlet, a process fluid outlet and a process fluid passage arranged between the process fluid inlet and the process fluid outlet as well as an actuating opening for introducing an adjusting rod for actuating the globe valve element, whereby the stroke axis of the adjusting rod movement intersects the actuating opening and the process fluid passage. The globe valve also has a body cover that covers the actuating opening. The housing cover may have a through-opening extending in the direction of the travel axis for receiving the adjusting rod and/or a mounting section for mounting a pneumatic adjusting drive, in particular a pneumatic yoke or the like, for supporting a pneumatic adjusting drive. As described above, in an exemplary embodiment, the through-opening is contact-free and/or seal-free with respect to the adjusting rod.

In an exemplary embodiment, the globe valve also includes an adapter to configure the globe valve as a cone valve. That is, in the globe valve, the globe valve element is a conical valve element (valve cone). The so-called valve cone has a contour that tapers in sections or completely in the direction of the stroke axis and does not have to be ideally conical. The adapter has a retaining flange section and includes a sleeve-shaped guide section that extends from the retaining flange section in the direction of the stroke axis. The guide section has a guide opening for the coaxial, preferably positive-locking reception of the adjusting rod, in particular in the form of a sliding or clearance fit. Together with the housing cover, the housing corpus defines a receptacle in which the retaining flange section is arranged. Preferably, the globe valve also comprises the adjusting rod and the conical actuator which is attached to the adjusting rod. The adjusting rod extends through the through opening of the housing cover and through the guide openings of the adapter.

In a configuration of the globe valve according to an embodiment, it can be configured as a cone valve with an adapter for a functional configuration of the globe valve. The globe valve may have one adapter selected and inserted from a set of different cone valve configuration adapters. The poppet valve configuration adapter of the globe valve may be as described above for the valve housing modular system. Similarly, the other components adapted in the cone valve configuration adapter may be designed according to the valve housing modular system described above, such as the body, cover, valve seat, etc. The globe valve configured as a cone valve can include further cone valve configuration adapters and can in particular be implemented without other adapters, in particular without cage valve adapters.

A globe valve is generally designated by the reference symbol 1. The main component of the globe valve is a housing 3 comprising a housing corpus 5 and a housing cover 7. Between housing corpus 5 and housing cover 7, a wide variety of adapters 100, 200, 300, 400 or 500 for one of the different functional or construction configurations of globe valve 1 are to be arranged in accordance with the disclosure.

As provided herein, the valve housing modular system can be configured to use the same housing, i.e. the same housing cover and the same housing corpus, in conjunction with a function and/or construction configuration adapter, which, according to the disclosure, can be freely selected from a series of different function and/or configuration adapters, but which are all assembly-compatible with regard to the same housing. By selecting a suitable adapter for the conditions prevailing in the associated process, a globe valve can be easily configured to fit without requiring a complete redesign of the globe valve.

In exemplary embodiments, the modular valve housing system is configured to use a single mounting flange section for all different function and/or design configuration adapters. A corpus interface and a cover interface are provided on the housing side to be compatible with the constant mounting flange section of the different adapters. In the valve housing modular system, the constant housing cover is provided with the predetermined cover interface and the constant housing corpus is provided with a constant corpus interface, whereby the corpus interface and cover interface are adapted to the constant retaining flange section of the different adapters. The standardized design of the corpus interface, cover interface and retaining flange section ensures that, when using the valve housing modular system to provide a functional or freely configured globe valve, it can be ensured that it provides a safe seal, precise control, is reliable and durable.

In an exemplary embodiment, an adapter is provided between housing corpus 5 and housing cover 7 of a globe valve 1 provided with the aid of the valve housing modular system. The different figures show globe valves 1, which are equipped with different adapters to implement different functional or construction configurations of the globe valve 1 shown.

According to one or more exemplary embodiments, the valve housing modular system includes a housing corpus 5 with a housing cover 7 seated on it. A housing interior is defined by the cover 7 and the corpus 5, which should at least partially accommodate process fluid. When the valve is open, the process fluid can flow from a process fluid inlet 11 through a process fluid passage 15 to a process fluid outlet 13 of the housing corpus 5. The valve can be actuated by means of the adjusting rod, which carries the adjusting member of the valve and with the aid of which the adjusting member can move linearly along the stroke axis A. The valve can be operated by means of the adjusting rod, which carries the adjusting member of the valve. The adjusting rod is led out of the housing interior 6 through the actuating opening 17. The cover 7 closes this actuating opening 17.

A seat ring or other valve seat 16 can be fixed in the area of the process fluid passage 15, for example screwed on (see FIG. 2a) or flanged on (see FIG. 1a). The valve seat 16 can cooperate sealingly with the linear moving adjusting member. If the adjusting member is in sealing closing contact with the valve seat 16, the process fluid cannot flow from process fluid inlet 11 to process fluid outlet 13 of globe valve 1.

The "wet" valve interior 8 carrying the process fluid is divided in the closed state of the globe valve 1 into an input-side or upstream area, which may be designated as the high-pressure area 8a, and a downstream or outlet-side area of the valve interior 8, which may be designated as the low-pressure area 8b. It is clear that the exemplary illustration in the figures for simplicity of readability is shown with always the same flow direction from the process fluid inlet 11 to the process fluid outlet 13, whereby it may be conceivable that a globe valve 1 can be flowed through in the reverse flow direction, i.e. from the process fluid outlet 13 to the process fluid inlet 11, according to the nomenclature used here, with correspondingly reversed pressure conditions.

A globe valve configured as a cage valve using an adapter from the valve housing modular system according to an exemplary embodiment is shown in FIG. 1a and the adapter 100 according to an exemplary embodiment that is used is shown in FIG. 1b. In an exemplary embodiment, the adapter 100 is inserted with its retaining flange section 111 into the housing corpus 5 and is held there by the cover 7, which is connected to the housing corpus 5 in a flange-like manner, for example. The cover 7 has a cover interface and the housing corpus 5 has a corpus interface which form a receptacle 50 in which the adapter 100 is inserted.

In an exemplary embodiment, the adapter 100 is designed to configure the globe valve 1 as a cage valve according to FIG. 1a. The adjusting member is formed by a stroke 131, which is permanently connected to the adjusting rod 21, which can move up and down the stroke axis A in translation.

The stroke body 131 has a circular cylindrical base whose outer circumferential edge can come into contact with a valve seat at process fluid passage 15 of the housing body 5.

The piston 131 has a cylindrical circumferential surface which expands in the direction of the stroke axis A to completely cover the openings of the valve cage 71 and thus close the valve. The valve cage 71 is a part of the adapter 100. The inner circumferential surface of the valve cage 71 is substantially complementary in shape to the outer circumferential surface of the piston 131, so that the piston 131 slides axially A through the valve cage 71 and the piston 131 can provide a sealing seal.

In an exemplary embodiment, the adapter 100 has a circular cylinder ring-shaped retaining flange section 111. The retaining flange section 111 has a certain flange diameter $D_F$ and a certain flange height $H_F$. As shown in FIG. 1a, the housing corpus 5 has an inner corpus diameter d5 in the area of the corpus interface which corresponds to the flange diameter $D_F$. For example, corpus inner diameter d5 and flange diameter $D_F$ can be matched to each other according to a fit, for example a clearance fit or a press fit. It is clear that radial and/or axial forward or backward projections of the retaining flange section 111 or the corpus interface can be provided in the retaining flange section 111 in order to determine a clear positioning of the adapter 100 with respect to the corpus 5.

In the axial direction A above the retaining flange section 111 and offset in the radial direction R, preferably radially inwards, the adapter 100 can have a mounting collar 151 which is designed to cooperate with a corresponding mounting inner surface 73 of the cover 7, for example as a sliding fit or clearance fit. The cover 7 can be formed in the area of the cover interface with an adapter diameter d7, which in particular is dimensioned to correspond to the diameter $D_K$ of the mounting collar 151. The axial longitudinal extension or collar height $H_K$ along which the adapter 100, through which the collar diameter $D_K$ is formed, can be greater than the flange height $H_F$, along which the retaining flange section 111 continuously has the constant flange diameter $D_F$.

FIG. 2a shows a globe valve 1 according to an embodiment that is configured as a cone valve and FIG. 2b shows the associated cone valve configuration adapter 200 according to an embodiment. In an exemplary embodiment, the adapter 200 comprises a sleeve-shaped guide section 221, an adjoining disc-shaped retaining flange section 211 and an adjoining mounting collar section 251. The mounting collar section 251 is used to insert the adapter 200 into a cover interface of the housing cover 7 that has been adapted to the adapter 200. The mounting collar has an outer diameter, which can be referred to as the collar diameter $D_K$, which is complementary in shape to the inside diameter d7 of the cover. The mounting collar 251 extends axially in the direction of the stroke axis A over a height which can be referred to as collar height $H_K$ with an essentially constant collar diameter $D_K$.

In an exemplary embodiment, the cover 7 has an inner surface complementary to the mounting collar 251, which can be called the mounting inner surface 73, along which the cover 7 is designed with a substantially constant cover inner diameter d7, the mounting inner surface 73 extending in axial direction A approximately as far, preferably somewhat further, than the collar height $H_K$.

In an exemplary embodiment, the disc-shaped retaining flange section 211 of the adapter 200 has the predetermined uniform flange height $H_F$ in its radially outer area. The holding flange section 211 defines the flange diameter $D_F$ of the adapter 200.

The sleeve-shaped guide section 221 of the adapter extends in the axial direction starting from the disc-shaped retaining flange section 211, radially offset inwards. The guide section 221 defines the guide opening 222, which is complementary in shape to the adjusting rod 21 in order to provide the adjusting rod 21 with a linear guide.

In an exemplary embodiment, the guide section 221 of the adapter 200 is formed below the guide opening 222 with a sealing section 225 in which the rod seal 25 is fixed. The rod seal 25 can, for example, be realized by a gap seal, labyrinth seal, plug seal, bellows seal or similar, e.g. with a press fit. The seal 25 can, for example, be held by a circlip in the sealing section 225 and/or secured against falling out in the axial direction. The seal 25 is in sealing contact with the adjusting rod 21 on the one hand and with the adapter 200 on the other hand in order to prevent process fluid from escaping from the valve interior 8 along the adjusting rod 21. The cavity 9 between the cover 7 and the adapter 200 can therefore be counted as a process fluid-free, dry ambient area. As indicated in FIG. 2a, a second rod seal may alternatively be provided as a cover seal 27 between the valve rod and the cover. The cover seal 27 can be designed as a stuffing box. In such an optional design, the rod seal 25 prevents the process fluid flow from the valve interior 8 from reaching the cover seal 27 unhindered.

In the area of the cover interface and/or the corpus interface, additional seals may be provided between the housing component and the adapter 200 to prevent leakage of the process fluid from the valve interior 8.

As shown in FIG. 2a, the retaining flange section 211 is seated on a radial inner shoulder 53 which extends all the way around the stroke axis A. The retaining flange section 211 is fitted with a radial inner shoulder 53 which extends all the way around the stroke axis A. The inner shoulder 53 is fitted with a radial inner shoulder 53 which extends all the way around the stroke axis A. A ring seal may be provided on shoulder 53 and under adapter 200. The shoulder 53 forms the lower end of a receptacle 50 for the adapter retaining flange 211. The inner diameter or the clear width of the receptacle is defined by a housing corpus inner diameter d5.

A ring-shaped axial projection 75 of the cover 7 engages in axial direction A in the receptacle 50 formed with the shoulder 53. The ring protrusion 75 has an outer diameter which is adapted to the housing corpus inner diameter d5. For example, the outer diameter of the axial projection 75 of cover 7 can be dimensioned with a clearance fit or a sliding fit with respect to the inside diameter d5 of the housing corpus.

For example, a flange connection for fastening the cover 7 to the housing corpus 5 can be provided radially outwards displaced from the receptacle 50 (not shown in detail). By attaching the cover 7 to housing corpus 5 using the flange connection (not shown in detail), the adapter 200 is attached between cover 7 and housing corpus 5. To fasten the adapter 200 between the housing cover 7 and the housing corpus 5, the axial projection 75 presses on the upper side of the retaining flange section 211 and thus presses the retaining flange section 211 with its underside against the shoulder 53 of the housing corpus 5.

The cover 7 has a through-opening 23 for the adjusting rod 21, which extends completely longitudinally through the cover 7 in the direction of the stroke axis A. The cover 7 is equipped with an opening 23 for the adjusting rod 21. The through opening 23 has a clear width that is larger than the adjusting rod 21 at its narrowest point, so that the adjusting rod 21 can move in it without making contact with the cover 23. As shown in FIG. 2a, the through opening 23 can be free of a seal. However, especially in a configuration as shown in FIG. 1a, it is conceivable that a seal may be provided in the area of the through opening 23 and/or a guide for the adjusting rod 21.

The housing cover 7 has at its upper end a mounting section 77 for connecting an adjusting drive (not shown in detail) or a mounting structure, such as a yoke, lantern or the like, to support an adjusting drive. For example, an adjusting drive can be pneumatic or electric, single or double acting, with or without spring return, etc.

Figure 3A:
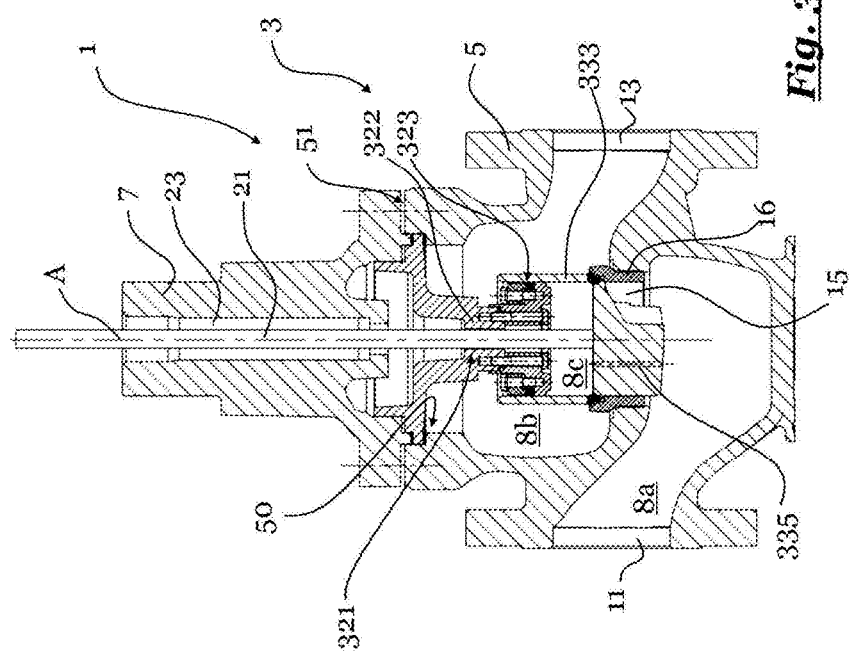
FIG. 3a shows a globe valve in a second conical valve configuration with pressure relief chamber and a third adapter of the valve housing modular system according to an exemplary embodiment of the disclosure, whereby the conical valve is shown in a closed position.

Like the globe valve 1 according to FIG. 2a, the globe valve 1 according to FIG. 3a is equipped with a cone valve configuration. The adapter 300 of the globe valve 1 according to FIG. 1a corresponds essentially to the design of the cone valve configuration adapter 200 described above. In addition, in an exemplary embodiment, the cone valve configuration adapter 300 is provided with a holder for a seal 323 opposite a collar 333 of the valve cone 331 to form a pressure relief chamber 8c at the rear of the valve cone 331.

In the globe valve shown in FIG. 3a, the process fluid can flow from the high pressure range 8a of the process fluid-carrying valve interior 8 through a pressure relief channel 335 into the pressure relief chamber 8c. The pressure in the pressure relief chamber 8c is essentially the same as in the high pressure range 8a, so that in axial direction A there is almost no pressure force on the conical valve cone 331 due to the pressure gradient between the high pressure range 8a and the low pressure range 8b. It is essentially the cross-sectional area of the adjusting rod 21 for which the pressure relief chamber 8c cannot provide a relief effect, so that a certain pressure difference acts in this area.

The sealing section of the adapter 300 is not shown in detail in FIG. 3a. It can, for example, be provided either in the area of the guide section 322 or in the area of the bracket 324 of the sealing ring 323. As an alternative or in addition, a cover seal 27 (not shown in detail) can be provided as an option.

In an exemplary embodiment, the cone valve member (valve cone) 331 is rigidly fitted with a sleeve-like collar 333 extending in the axial direction, which is completely fluid-tight in the circumferential direction. The bracket 324 of the adapter 300 can consist of two flange rings as shown in FIG. 3a. The bracket may include an inner flange ring provided with connecting screws for securing the bracket ring 324 to a sleeve-shaped guide section 322 of the adapter 300. The second flange ring of the seal carrier 324 can be screwed to the first flange portion of the seal carrier 324 to provide a ring groove-like receptacle for the seal ring 323 together with the first part of the seal carrier.

The retaining flange section 311 and the mounting collar 351 of the adapter 300 are designed in exactly the same way as the corresponding components of the adapter 200 described above with respect to FIGS. 2a and 2b.

FIG. 3a shows the globe valve with pressure relief chamber 8c closed and FIG. 3c shows the same globe valve as shown in FIG. 3a, but in an open position of the valve. In FIG. 3a, the valve cone 331 is in sealing contact with the valve seat 16. In the opening state illustrated in FIG. 3c, the valve cone 331 is in its widest possible open position in order to release the maximum opening cross-section of the process fluid passage 15 in accordance with the illustrated globe valve configuration, so that process fluid with the largest possible volume flow in this configuration can flow from the process fluid inlet 11 to the process fluid outlet 13.

FIG. 4a shows a globe valve according to an exemplary embodiment that is equipped with a different plug valve configuration adapter 400 according to the valve housing modular system.

Figure 3B:
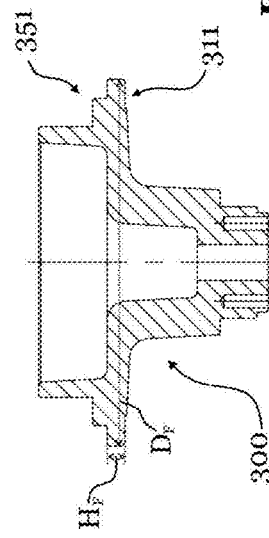

FIG. 4b shows the adapter 400 in detail. The Adapter 400 is similar to the Adapter 300 shown in FIG. 3b. The adapters 300 and 400 differ in that the adapter 400 is equipped with an annular groove 473 on the underside of the plate-like retaining flange section 411 pointing into the valve interior 8 to accommodate a flow divider 471. With the aid of the annular groove 473 in the adapter 400, the flow divider 471 shown in FIG. 4a can be held in a defined mounting position in the valve housing.

The housing corpus 5 can also have a retaining groove 475 for the flow divider 471. The flow divider 471 is similar in design to a valve cage and has numerous radial openings, each with a small inner diameter, in order to maintain a large pressure difference between the high pressure range 8a and the low pressure range 8b even when the cone valve is fully open.

Below the flow divider, the valve seat ring 16 is fixed to the body. The valve seat insert 16 can be designed in such a way that it can be fitted with an additional mounting option for the flow divider 471 (alternatively or in addition to one of the holding grooves 473, 475 described above).

Like the adapter 300, the adapter 400 is also equipped with a retaining flange section 411, which is identical to the retaining flange sections 211, 111 of the adapters described above, so that the adapters can be exchanged in the valve body 3.

FIG. 5a shows a globe valve 1 according to an exemplary embodiment that is equipped with another adapter 500 based on the valve housing modular system and configured as a cone valve. Functionally similar to the cone valves previously described in FIGS. 3a, 3b and 4a, the cone valve shown in FIG. 5a also has a pressure relief force 8c which is fluidically connected to the high pressure range 8a via a pressure relief channel 335 extending through the valve cone 331.

The adapter 500 according to an embodiment differs from the adapters 400 and 300 in that it is implemented without a guide section and, in addition to the mounting collar 551 and the retaining flange section 511, only has a sealing sleeve section 524 as a further functional component, which provides a sealing mating contact surface opposite the collar 333' of the valve cone 331. The contact area between the collar 333' of the valve cone 331 and the sealing sleeve section 524 of the adapter 500 preferably contains a seal 523. The seal can, for example, be in the form of a sealing ring 523 which is located in a fastening groove on the outer circumference of the collar 333'. Alternatively, in an exemplary embodiment, a seal is located in a radially inside groove holder of the sealing sleeve 524 (not shown in detail). In the case of globe valve 1 according to FIG. 5a, a seal and/or an adjusting rod guide can be supported by the cover 5.

The features disclosed in the above description, in the figures and in the claims can be of importance both individually and in any combination for the realization of the disclosure in its various configurations.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein.

It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

REFERENCE LIST

1 globe valve
3 housing
5 housing corpus
6 housing interior
7 housing cover
8 valve interior
8a high pressure area
8b low pressure area
8c pressure relief chamber
9 cavity
11 process fluid inlet
13 process fluid outlet
15 process fluid passage
16 valve seat
17 actuating opening
21 adjusting rod
23 through-opening
25 rod seal
27 cover seal
50 receptacle
53 inner shoulder
71 valve cage
73 mounting inner surface
75 protrusion
77 mounting section
100, 200, 300, 400, 500 adapter
111, 211, 311, 411, 511 retaining flange section
131 stroke body
151, 251, 351, 551 mounting collar
221, 222, 322 guide section
225 sealing section
323, 523 seal
324 bracket
231, 331 valve cone
333, 333' collar
335 pressure relief channel
471 flow divider
473 annular groove
475 retaining groove
524 sealing sleeve section
A stroke axis, axial direction
DF flange diameter
DK diameter of the mounting collar
d5 corpus inner diameter
d7 adapter diameter
h axial height
HF flange height
HK collar height
R radial direction

The invention claimed is:

1. A valve housing modular system adapted to provide one of several different functional or constructional configurations for a globe valve configured to adjust a process fluid flow of a process plant, the globe valve including a stroke valve member movable in translation along a stroke axis, the valve housing modular system comprising:
   a housing corpus including a process fluid inlet, a process fluid outlet, a process fluid passage arranged between the process fluid inlet and the process fluid outlet, and an actuating opening configured to introduce an adjusting rod that is configured to actuate the stroke valve member along the stroke axis;
   a housing cover configured to cover the actuating opening, the housing cover including a through opening extending in the direction of the stroke axis that is configured to receive the adjusting rod; and
   a plurality of different swappable adapters each configured for one of said different functional or constructional configurations, the plurality of different adapters including at least one first adapter type and at least one second adapter type different from the first adapter type, each of said plurality of different adapters including a cylindrical retaining flange portion having a predetermined flange height and a predetermined flange diameter, wherein:
   the housing corpus further includes a corpus interface adapted to the cylindrical retaining flange portions, wherein a first adapter outer diameter is substantially equal to a predetermined corpus inner diameter;
   the housing cover further includes a cover interface adapted to the cylindrical retaining flange portions, wherein a second adapter outer diameter is substantially equal to a predetermined cover inner diameter, the second adapter outer diameter forming a mounting collar of the adapter to be inserted axially into the cover, and wherein the mounting collar is configured to cooperate with a corresponding mounting inner surface of the cover as a sliding fit or clearance fit; and
   the housing corpus and the housing cover are collectively configured to selectively engage an individual one of the plurality of different swappable adapters to provide the globe valve with the corresponding functional or constructional configuration of the individual one of the plurality of different swappable adapters.

2. The valve housing modular system according to claim 1, wherein the first adapter type is a cone valve adapter type configured to configure the globe valve as a cone valve, the stroke valve member being a cone-like adjusting member, which is carried by the adjusting rod, wherein an adapter of the plurality of adapters being of the first adapter type includes a sleeve-shaped guiding section extending in the direction of the stroke axis from the respective cylindrical retaining flange portion and includes a guiding opening configured to coaxially receive the adjusting rod.

3. A valve housing modular system according to claim 2, further comprising a rod seal configured to provide a seal between the adjusting rod and the at least one of the plurality of adapters, the at least one of the plurality of adapters having a receptacle for the rod seal in the sleeve-shaped guiding section.

4. The valve housing modular system according to claim 2, wherein the cone-like adjusting member includes a sleeve-shaped collar and a pressure relief channel extending through the cone-like adjusting member in an axial direction relative to the stroke axis, the at least one of the plurality of adapters carrying a seal cooperating with the sleeve-shaped collar.

5. The valve housing modular system according to claim 2, wherein the at least one of the plurality of adapters and/or the housing corpus includes a positive-locking connection extending around the process fluid passage and/or being annular-shaped for receiving a flow divider.

6. The valve housing modular system according to claim 1, wherein at least one of the plurality of adapters is arranged in an axial direction with respect to the stroke axis between the housing corpus and the housing cover, the housing cover extending, from the adjusting rod, in a radial direction beyond the predetermined flange diameter.

7. The valve housing modular system according to claim 1, wherein the cover interface, together with the corpus interface, forms an annular receptacle into which the respective cylindrical retaining flange portion of one of the plurality of adapters can be inserted.

8. The valve housing modular system according to claim 7, wherein the annular receptacle includes a predetermined axial height in the direction of the stroke axis and extends from the housing corpus to the housing cover, and at least one predetermined width, wherein the cylindrical holding flange portions of the plurality of adapters and the receptacle are complementarily shaped.

9. The valve housing modular system according to claim 1, wherein the corpus interface is defined by a step-like recess of the housing corpus at its upper corpus end in the axial direction with respect to the stroke axis.

10. The valve housing modular system according to claim 1, wherein the corpus inner diameter corresponds to a flange diameter of at least one of the plurality of adapters, and/or wherein the cover inner diameter corresponds to a collar diameter of an assembly collar of the respective one of the plurality of adapters.

11. The valve housing modular system according to claim 1, wherein the second adapter type is a cage valve adapter type configured to configure the globe valve as a cage valve with a piston-like adjusting member as the stroke valve member and a valve cage surrounding the process fluid passage relative to the stroke axis, the valve cage including a translatory guide cooperating with the piston-like adjusting member.

12. The valve housing modular system according to claim 1, wherein the through opening is configured to receive a fastening section configured to mount a pneumatic adjusting drive or mount a yoke configured to carry an adjusting drive.

13. The valve housing modular system according to claim 1, wherein:
   the first adapter type is a cone valve adapter type configured to configure the globe valve as a cone valve; and
   the second adapter type is a cage valve adapter type configured to configure the globe valve as a cage valve.

14. The valve housing modular system according to claim 1, wherein:
   the first adapter type is a cone valve adapter type configured to configure the globe valve as a cone valve, the stroke valve member being a cone-like adjusting member, which is carried by the adjusting rod; and
   the second adapter type is a cage valve adapter type configured to configure the globe valve as a cage valve with a piston-like adjusting member as the stroke valve member and a valve cage surrounding the process fluid passage relative to the stroke axis, the valve cage including a translatory guide cooperating with the piston-like adjusting member.

15. The valve housing modular system according to claim 1, wherein:
- the corpus interface has a corpus inner diameter corresponding to a flange diameter of at least one of the plurality of adapters; and
- the cover interface has a cover inner diameter corresponding to a collar diameter of an assembly collar of the respective one of the plurality of adapters.

16. The valve housing modular system according to claim 1, wherein the second adapter outer diameter is smaller than the first adapter outer diameter.

17. The valve housing modular system according to claim 1, wherein the adapter has a disc-shaped retaining flange section of a flange diameter and an adjoining mounting collar section, wherein the mounting collar extends axially in the direction of the stroke axis over a collar height greater than the flange height, along which the retaining flange section has the flange diameter.

18. The valve housing modular system according to claim 1, wherein the mounting collar of the adapter is configured to be inserted axially into a receptacle of the cover at least partially formed by the mounting inner surface of the cover.

19. The valve housing modular system according to claim 1, wherein the mounting inner surface of the cover extends in an axial direction.

20. A globe valve with a globe valve member translationally movable along a stroke axis for adjusting a process fluid flow of a process plant, comprising:
- a housing corpus with a process fluid inlet, a process fluid outlet, a process fluid passage arranged between the process fluid inlet and the process fluid outlet, and an actuating opening configured to introduce an adjusting rod configured to actuate the globe valve member, wherein the stroke axis intersects the actuating opening and the process fluid passage;
- a housing cover configured to cover the actuating opening, the housing cover including a through opening extending in the direction of the stroke axis that is configured to receive the adjusting rod; and
- an adapter configured to configure the globe valve as a conical valve, the adapter comprising a retaining flange portion and a sleeve-shaped guiding portion extending from the retaining flange portion in the direction of the stroke axis and having a guiding opening for coaxially receiving the adjusting rod, wherein:
- the housing corpus, together with the housing cover, defines a receptacle in which the retaining flange portion is arranged,
- the adapter is configured to divide the housing interior into a wet, process fluid-carrying valve interior defined by the adapter and the housing corpus, and a dry, process fluid-free cavity between the adapter and the housing cover, and
- the adjusting rod passes through, and at least partially resides in, the process fluid-free cavity.

* * * * *